Jan. 14, 1969   D. L. JONES, JR   3,421,173
PULSE WIPER CONTROL
Filed June 9, 1967
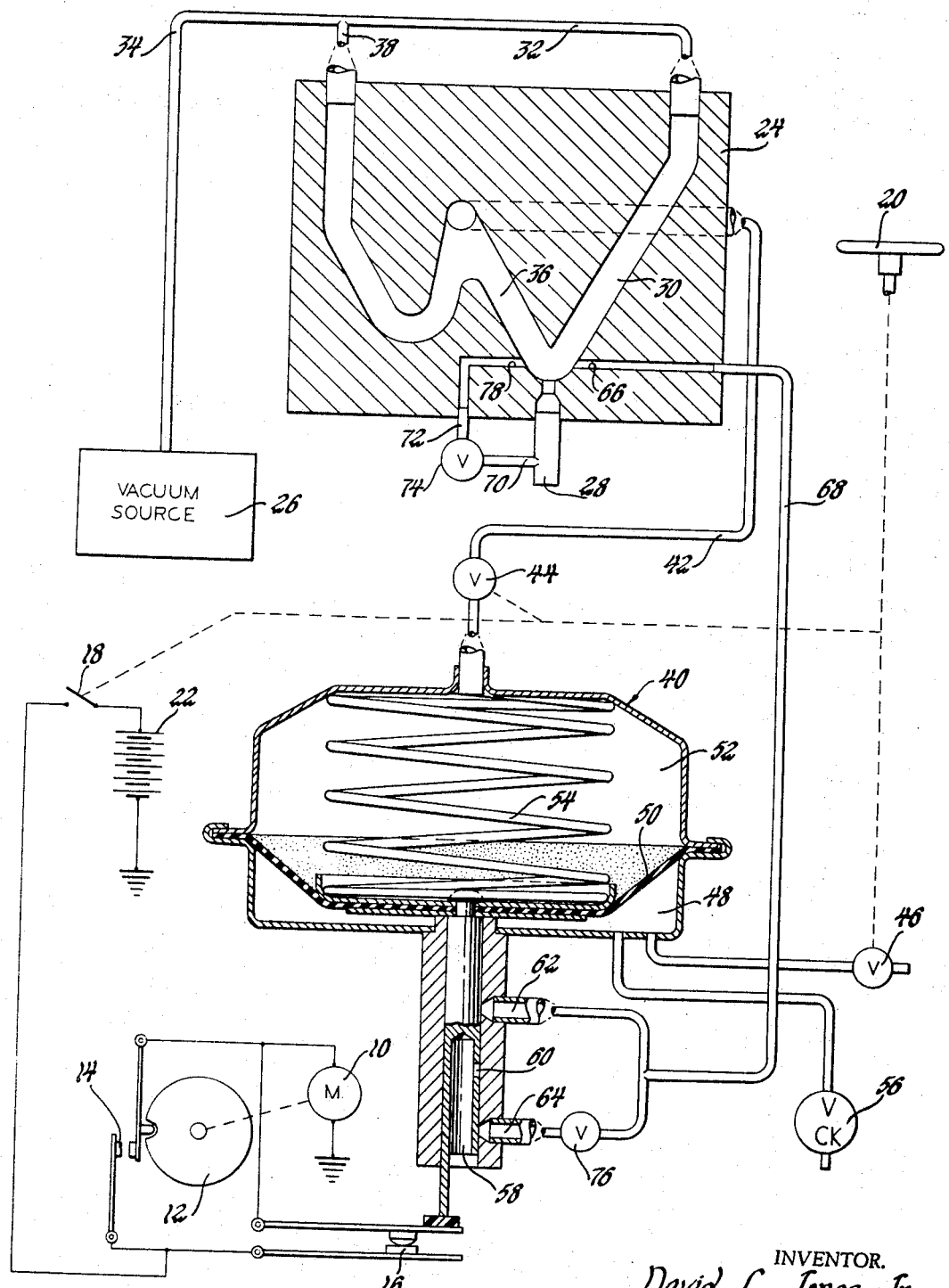
INVENTOR.
David L. Jones, Jr.
BY
Donald P. Selnecki
ATTORNEY

United States Patent Office 3,421,173
Patented Jan. 14, 1969

3,421,173
PULSE WIPER CONTROL
David L. Jones, Jr., Dayton, Ohio, assignor to General Motors Corporation, Detroit, Mich., a corporation of Delaware
Filed June 9, 1967, Ser. No. 644,977
U.S. Cl. 15—250.12                     2 Claims
Int. Cl. B60s 1/10; F15b 13/04; F15c 3/00

ABSTRACT OF THE DISCLOSURE

In a preferred form, the present invention teaches a pulse or intermittent windshield wiping system wherein the time delay between pulses is controlled by a monostable fluid amplifier having a high memory and an "and" logic input with a hysteresis controlled shift back.

---

This invention relates to windshield wiping systems and more particularly to a fluid amplifier controlled pulse wiping system.

Windshield wipers can be categorized in two basic ways when viewed from the type of wiping action generated on a windshield. A first type windshield wiping system is either electrical, hydraulic, or vacuum as powered, but has a single or variable speed wipe which generally means in the art that a wiper blade continuously moves to wipe a predetermined area of the windshield at any preset speed. A second type of wiping system is the pulse or intermittent wiper which can also be electrical, hydraulic or vacuum as powered, but which has the added feature of a pause or delay between cycles of wiping the desired portion of the windshield. The advantage of this system is that the wiper blade is not constantly moving in front of a driver and, theoretically, the frequency of wipe is determined by the need therefor. Normally, within a given cycle the wiper blade moves at a constant rate of speed. Most desirably, the frequency of wipe should be variable between a low frequency, for example, five wipes per minute to a continuous wipe which might generate upwards of forty wipes per minute, depending on the motor speed. Normally the more desirable pulse wiping systems require very intricate mechanisms for control, therefore, being correspondingly more expensive than continuous wiping systems. In addition, intermittent or pulse wipers, having intricate control mechanisms, are prone to require more maintenance than continuous wiping systems.

It is an object of the present invention to provide a pulse wiping system which is very simple and economical to manufacture but which is not maintenance prone and has few moving parts.

It is another object of the present invention to provide an improved pulse wiping system which is actuatable by a single control which energizes both the power source and the wipers as well as setting the frequency of wipe at the same time.

It is still another object of the present invention to provide an improved pulse wiping system utilizing a monostable, high memory, "and" logic type fluid amplifier to shift the fluid stream selectively to a timing device which controls the delay between wiping cycles.

It is yet a further object of the present invention to provide an improved pulse wiping system which is adaptable for use on vehicles of common design and compatible with conventional windshield wiping systems associated therewith.

Further objects and advantages of the present invention will be apparent from the following description, reference being had to accompanying drawing wherein a preferred embodiment of the present invention is clearly shown.

In the drawing:

In the single figure drawing, a fluid amplifier controlled pulse wiping system is illustrated diagrammatically.

Referring to the drawing, an electrical motor 10 drives windshield wipers across a windshield through mechanical linkage in a conventional manner. A cam 12 rotating with motor 10 allows one operating cycle of the wipers across a windshield per revolution. Therefore, a switch 14 is cam operated and results in one wipe cycle being generated each time a switch 16 is momentarily closed. Switch 16 is sometimes referred to herein as a second switch means. A switch 18 is mechanically connected with a windshield wiper system control 20 and closes a circuit from a power source 22 to energize motor 10 when either switch 14 or 16 is closed. Switches 14 and 18 together are herein referred to as first switching means.

A fluid amplifier, generally designated by numeral 24, is vacuum powered from a source 26 and draws atmospheric air into inlet 28 to provide a power stream for fluid amplifier 24. Leg 30 of fluid amplifier 24 communicates with vacuum source 26 through line 32 and line 34. Leg 36 of fluid amplifier 24 communicates with vacuum source 26 through line 38 and line 34. In addition, leg 36 communicates with a timing device 40 through line 42. The flow through line 42 is metered by variable orifice valve 44. Valve 44 as well as switch 18 is controlled by rotation of the windshield wiper control 20. Wiper control 20 also conjointly regulates bleed valve 46 regulating the rate of air inflow to chamber 48 of timing device 40.

Timing device 40 is separated into two chambers by diaphragm 50, the aforementioned chamber 48 and a vacuum chamber 52. Spring 54 urges diaphragm 50 toward an extreme of movement in chamber 48, as shown in the drawing, under unpowered conditions. Another check valve 56 is a one-way check valve allowing free air escape from chamber 48 to the atmosphere.

Slide valve and switch actuator 58 has a dual function. A first function is to allow a normally open switch 16 to open in response to its inherent bias to control the dwell time between wiping cycles. Slide valve 58 has a hollow center which allows atmospheric air communication through aperture 60 to inlet 62 when the two are aligned after a predetermined amount of movement of slide valve 58. A lesser amount of movement of slide valve 58 also communicates atmospheric air to inlet 64. The "and" logic requirement of fluid amplifier 24 is satisfied when both inlets 62 and 64 are open to the atmosphere together providing the shifting bias to amplifier 24 at port 66 through line 68. A preset bias flow to amplifier 24 through lines 70 and 72 is controlled by a presetting of flow valve 74. Valve 76 in inlet 64 is also preset and controls the shift back response point of the system in a manner to be hereinafter described.

In operation, the subject system is energized by rotation or actuating movement of control 20. Conjointly, switch 18 is closed and variable orifice valve 44 and valve 46 are progressively opened depending on the amount of movement control 20. Under static conditions, spring 54 is the dominant force on diaphragm 50 and, therefore, slide valve 58 maintains switch 16 in a closed position. With switch 16 closed, power is provided for motor 10 from power source 22 and a cycle of the windshield wipers is initiated. As motor 10 becomes operative, cam 12 begins to rotate, closing switch 14. Thereafter, during a given cycle, power will continue to motor 10 from power source 22 regardless of the position of switch 16.

It should be appreciated that, with valve 44 closed, the bias flow through lines 70 and 72 provides a memory for amplifier 24, resulting in a flow through leg 30 to the vacuum source from inlet 28. It is obvious then that a greater pressure exists in leg 30 than in leg 36. However, as soon as valve 44 is opened, the lower pressure in leg 36 is communicated through line 42 to vacuum chamber 52. Diaphragm 50 immediately moves against the pressure of spring 54 drawing slide valve 58 with it thereby opening switch 16. It should then be noted that one path for current flow to motor 10 is destroyed when switch 16 opens but a second path exists through closed switch 14. Therefore, motor 10 will operate only until cam 12 completes one revolution and switch 14 is opened. One revolution of cam 12 will allow one motion of the windshield wipers on the windshield from a parked position through a complete sweep and return to the park position. It is obvious that switch 16 must again be closed before another cycle can begin.

While wipers are completing the single cycle, diaphragm 50 is moving to an extreme of movement in vacuum chamber 52. Slide valve 58 follows this movement and initially allows the communication of atmospheric air to inlet 64. This raises the pressure bias at port 66 but does not allow a shift in the power stream from leg 30 to leg 36 until aperture 60 and inlet 62 are aligned. It is obvious that the rate of movement of diaphragm 50 is controlled both by the amount of opening of valve 44 as well as the amount of air bled into chamber 48 through valve 46. The more valves 44 and 46 are opened, the quicker will diaphragm 50 move to uncover inlets 64 and 62, thereby satisfying the "and" logic requirement of amplifier 24.

With both inlets 62 and 64 open to atmosphere, the bias at port 66 is sufficient to shift the power stream to leg 36. With the stream going through leg 36, line 42 becomes pressurized, thereby allowing spring 54 in timing device 40 to drive diaphragm 50 toward the position shown in the drawing. The blocking of inlet 62 is not sufficient to reshift the power stream from leg 36 to leg 30 because of a hysteresis effect controlled by valve 76. Inlet 64 must also be blocked by slide valve 58 before the memory circuit providing a bias at port 78 engenders a shift of the power stream from leg 36 to leg 30. As this shift occurs from leg 36 to leg 30, the pressure in line 32 is again reversed and the cycle repeats itself.

It is apparent then that the rate of movement of diaphragm 50 and slide valve 58 uncovering inlets 64 and 62 determines the amount of time that switch 16 is open. This time will normally be longer than the time required for one revolution of cam 12 and, therefore, there will be a delay between operating cycles of the windshield wipers. With variable valves 44 and 46 completely open, diaphragm 50 will move up and down within the time it takes for one revolution of cam 12 and, therefore, switch 16 will be closed when switch 14 is opened. Consequently, motor 10 will be continually powered, resulting in the windshield wipers moving across the windshield continuously. It is equally apparent that, with a very slight opening of valve 44 and valve 46, the movement of diaphragm 50 can be greatly delayed bringing about a much longer interval when both switch 14 and switch 16 are opened. This delay determines the pulsing frequency of the system.

Another feature of the subject pulse wiping system that is important is the automatic overriding of the pulse setting or frequency that occurs when vacuum diminishes in source 26. It is understood that in a given installation, vacuum source 26 could be the intake manifold of a vehicle engine. When an accelerator in a vehicle is pushed down very rapidly, the throttle in the carburetor opens more fully, resulting in a lowering of the negative pressure in the intake manifold. This is a typical condition generated when the vehicle passes another vehicle on a highway. Under these conditions, when there is sufficient moisture on the windshield to warrent even a low frequency operation of the windshield wipers, it is desirable that continuous windshield wiping be available without the need for manual control. The present system is designed so that an abrupt lowering of the vacuum pressure will make the fluid amplifier power stream return to leg 30 and insufficient negative pressure will be present to hold diaphragm 50 against spring 54. Therefore, diaphragm 50 will be immediately positioned in the configuration shown in the drawing closing switch 16. When switch 16 is closed, power is available to motor 10 and the wiping will be continuous. This will occur at any place in the cycle effectively overriding the delay provided by the diaphragm 50 depressing spring 54. It is obvious that, with diaphragm 50 already in the position shown in the drawing, motor 10 is powered and wiping will continue as long as diaphragm 50 does not move.

Flow valve 74 is adjusted to a predetermined flow setting when the system is originally installed in the vehicle as well as hysteresis control valve 76. It is obvious that either of these valves can be later adjusted to gain a different response for the system as desired in a given installation. It should be noted that the closing of control valve 20 opens switch 18, deenergizing the electrical portion of the system, resulting in a return of the power stream to leg 30 regardless of the position of the stream when control 20 is closed. The system is thereby returned to a poised position readying it for operation upon demand.

While the embodiment of the present invention, as herein disclosed, constitutes a preferred form, it is to be understood that other forms might be adopted.

What is claimed is:

1. A windshield wiping system having a continuous and a pulsing mode, said system comprising: motor means for driving windshield wipers in a predetermined pattern across a windshield; first switch means for energizing said motor means; second switch means for closing a circuit to said motor means in a selected manner depending on the relative position of the windshield wipers in the wipe pattern; a fluid amplifier for directing a flow of atmospheric air in either of two directions, a flow in a first direction leaving said motor means deenergized; and timing means responsive to a fluid flow through said fluid amplifier in a second direction to open said second switch means, said timing means including a bleed valve controlling input of fluid to said timing means and being interconnected with said second switch means to energize said motor means when a predetermined amount of fluid flow from said fluid amplifier to said timing means is exceeded whereby said motor means moves the windshield wipers across the windshield from a position of rest through one cycle of operation back to a position of rest, the interval between cycles of operation of said motor means being determined by the time it takes said timing means to reset when fluid flow shifts from a first side to a second side of said fluid amplifier.

2. A windshield wiper system having a continuous and a pulse mode, said system comprising: an electric motor and linkage associated therewith for driving a plurality of windshield wiper blades from a position of rest near a margin of a windshield through a predetermined wipe pattern on a windshield back to a position of rest; first switch means for electrically connecting said electric motor to a power source, said first switch means being referenced to the position of the wiper blades on the windshield and including a cam operated electric switch responsive to motor rotation to open or close a circuit to said power source; timing means including a spring loaded diaphragm having an extension therefrom; a fluid amplifier connected to a vacuum source and selectively providing an input to said timing means; second switch means responsive to movement of said extension from said diaphragm, said extension also acting as a sliding valve venting atmosphere to bias said fluid amplifier in a sequential manner giving said fluid amplifier an "and" logic capability; and control means mechanically linked to a portion of said first switch means and providing a bleed control to said timing means of a variable type controlling the response thereof to said fluid amplifier, said fluid amplifier being a high memory type having a fluid flow through a first leg thereof under conditions when said control means is closed, a power stream to said fluid amplifier shifting to a second leg thereof when said control means is opened a given amount thereby drawing said extension of said diaphragm away from said second switch means allowing an opening of said second switch means and also biasing said first leg of said fluid amplifier when a predetermined amount of movement of said extension has been completed to allow said timing means to return to a poised position, the time between full deflections of said diaphragm being the dwell time between operative cycles of said windshield wiper system, the dwell time being directly controllable by the amount of opening of said control means.

References Cited

UNITED STATES PATENTS

| | | | |
|---|---|---|---|
| 3,110,056 | 11/1963 | Oishei et al. | 15—250.12 |
| 3,111,291 | 11/1963 | Horton | 137—81.5 |
| 3,124,999 | 3/1964 | Woodward | 137—81.5 XR |
| 3,168,758 | 2/1965 | Oishei et al. | 15—250.12 |
| 3,219,901 | 11/1965 | Foreman et al. | 15—250.12 XR |

OTHER REFERENCES

The Fluid Amplifier by T. F. Sinclair, published by Radio-Electronics, February 1956, pages 44 to 46.

Fluidics Made Easy, by Carlos Pinkstaff, published by Hydraulics & Pneumatics, March 1966, pages 90 and 91.

PETER FELDMAN, *Primary Examiner.*

U.S. Cl. X.R.

91—3; 137—81.5